United States Patent [19]

Hollmann et al.

[11] Patent Number: 5,196,178
[45] Date of Patent: Mar. 23, 1993

[54] METHOD OF PRODUCING DUSTFREE SILVER NITRATE

[75] Inventors: Dieter Hollmann; Roland Gerner, both of Rodenbach, Fed. Rep. of Germany

[73] Assignee: Degussa Aktiengesellschaft, Frankfurt am Main, Fed. Rep. of Germany

[21] Appl. No.: 771,552

[22] Filed: Oct. 8, 1991

[30] Foreign Application Priority Data

Oct. 9, 1990 [DE] Fed. Rep. of Germany ....... 4031952

[51] Int. Cl.$^5$ .................... C01B 21/48; C01F 11/36
[52] U.S. Cl. .................... 423/395; 423/23; 423/28; 423/397
[58] Field of Search ............ 423/395, 28, 23, 397; 23/293 C, 313 R

[56] References Cited

U.S. PATENT DOCUMENTS

| | | | |
|---|---|---|---|
| 3,141,731 | 7/1964 | Dietz | 423/395 |
| 3,222,128 | 12/1965 | Sooryn | 423/395 |
| 3,554,883 | 1/1971 | Green | 423/395 |
| 4,136,157 | 1/1979 | Asai et al. | 423/385 |

Primary Examiner—Theodore Morris
Assistant Examiner—Edward Squillante
Attorney, Agent, or Firm—Beveridge, DeGrandi, Weilacher & Young

[57] ABSTRACT

In order to produce dustfree silver nitrate which can be readily dosed, silver nitrate is atomized in a molten state. A purity of the silver nitrate of greater than 99%, a pH of 2 to 6, and the exclusion of light during the atomizing are necessary.

6 Claims, No Drawings

METHOD OF PRODUCING DUSTFREE SILVER NITRATE

BACKGROUND OF THE INVENTION present invention relates to a method of producing dustfree silver nitrate by atomizing a silver nitrate melt and solidifying the formed drops in a cooling medium wherein the atomizing and the solidifying of the drops must be carried out under the exclusion of light.

Silver nitrate is widely used in industry, especially in the photographic industry. It is normally sold and handled in the form of crystals like those which accumulate upon crystallization from an aqueous solution of silver nitrate. When silver nitrate powder is handled, the health of people who deal with silver nitrate can be endangered (e.g. in the form of burns) due to the swirling of the fine dustlike component. Due to the very different sizes of the crystals, silver nitrate exhibits an uneven charging and flow behavior, which is disadvantageous, e.g. for its use in automatic dosing systems when packaging amounts of silver nitrate.

Dustfree silver nitrate was not known in the past. DE application 40 22 648.4 discloses a method for the production of silver nitrate spherules by atomizing a silver nitrate melt at approximately 215° C. and quenching the melt droplets in a cooling medium. This yields a dustfree product but it is not suitable for use in the photographic industry because it exhibits discolorations.

SUMMARY OF THE INVENTION

One object of the present invention was to solve the problem of developing a method for the production of dustfree silver nitrate by means of atomizing a silver nitrate melt and solidifying the formed drops in a cooling medium under the exclusion of light, the product of which can also be used in the photographic industry.

DETAILED DESCRIPTION OF THE INVENTION

The present invention solves the above described problem in that the silver nitrate in the melt exhibits a purity of more than 99% and a pH of 2 to 6, measured as 10% aqueous solution, and that the melting, the atomizing and the solidifying of the drops must be carried out under the exclusion of light.

The purity of the silver nitrate should preferably be greater than 99.9% and the pH preferably between 4.0 and 5.5.

The atomization of the silver nitrate melt takes place advantageously in a device comprising a melt container for the silver nitrate, one or more oscillating nozzles, and a falling drop section with cooling. Such a device is described e.g. in German patent application P 40 22 648.4 Silver nitrate spherules are produced with a uniform size of approximately 50 μm to approximately 1 mm diameter, according to the nozzle diameter used. The product does not contain any fine dusty component and exhibits good flowability, so that is can be readily dosed and handled.

EXAMPLE

The following example is intended to explain the method of the invention in more detail:

2 kg silver nitrate (purify > 99.9%) were melted in a container under the exclusion of light. The silver nitrate had a pH of 4.8 (measured using a 10% aqueous solution). The melt was heated at 220° C. and supplied to a nozzle oscillating with a frequency of 800 Hz and with a nozzle diameter of 350 μm. The spherules which were cooled down with an inert gas exhibited a uniform diameter of approximately 700 μm, without fine components and coarse components. The atomizing and cooling off also took place under the exclusion of light. The silver nitrate powder produced in this manner exhibited no discolorations and was superbly suited for use in the photographic industry.

The melt can be heated from 212° to 440° C. The nozzle can oscillate from 50 to 2000 Hz. The nozzle diameter can be from 25 to 500 μm.

Further variations and modifications of the invention will become apparent to those skilled in the art from the foregoing and are intended to be encompassed by the claims appended hereto.

What is claimed:

1. A method of producing dustfree silver nitrate spherules comprising atomizing a silver nitrate melt to form drops and solidifying the formed drops in a cooling medium, wherein the silver nitrate in said melt exhibits a purity of more than 99% and a pH of 2 to 6, measured as 10% aqueous solution, and wherein the melting, the atomizing and the solidifying of said silver nitrate is carried out under the exclusion of light.

2. The method according to claim 1, wherein the purity of said silver nitrate is greater than 99.9% and said pH is between 4.0 and 5.5.

3. The method according to claim 1, wherein said dust free silver nitrate spherules have a uniform size of approximately 50 μm to 1 mm in diameter.

4. The method according to claim 1, wherein said dustfree silver nitrate is free of discolorations.

5. A method of producing dustfree silver nitrate spherules comprising forming a silver nitrate melt, atomizing said silver nitrate melt to form drops, and solidifying the formed drops in a cooling medium, wherein the silver nitrate in said melt exhibit a purity of more than 99% and a pH of 2 to 6, measured as 10% aqueous solution, and wherein the melting, the atomizing and the solidifying of said silver nitrate is carried out under the exclusion of light.

6. A method of producing dustfree silver nitrate spherules comprising atomizing a silver nitrate melt to form drops and solidifying the formed drops in a cooling medium, wherein the silver nitrate in said melt exhibits a purify of more than 99% and a pH of 2 to 6, measured as 10% aqueous solution, and wherein the melting, the atomizing and the solidifying of said silver nitrate is carried out under the exclusion of light, wherein said dust free silver nitrate spherules have a uniform size of approximately 50 μm to 1 mm in diameter.

* * * * *